W. A. WILLIS & J. H. BELAND.
PREPARING STOCK FOOD AND OIL FROM COTTON SEED.
APPLICATION FILED SEPT. 19, 1910.
994,088.
Patented May 30, 1911.
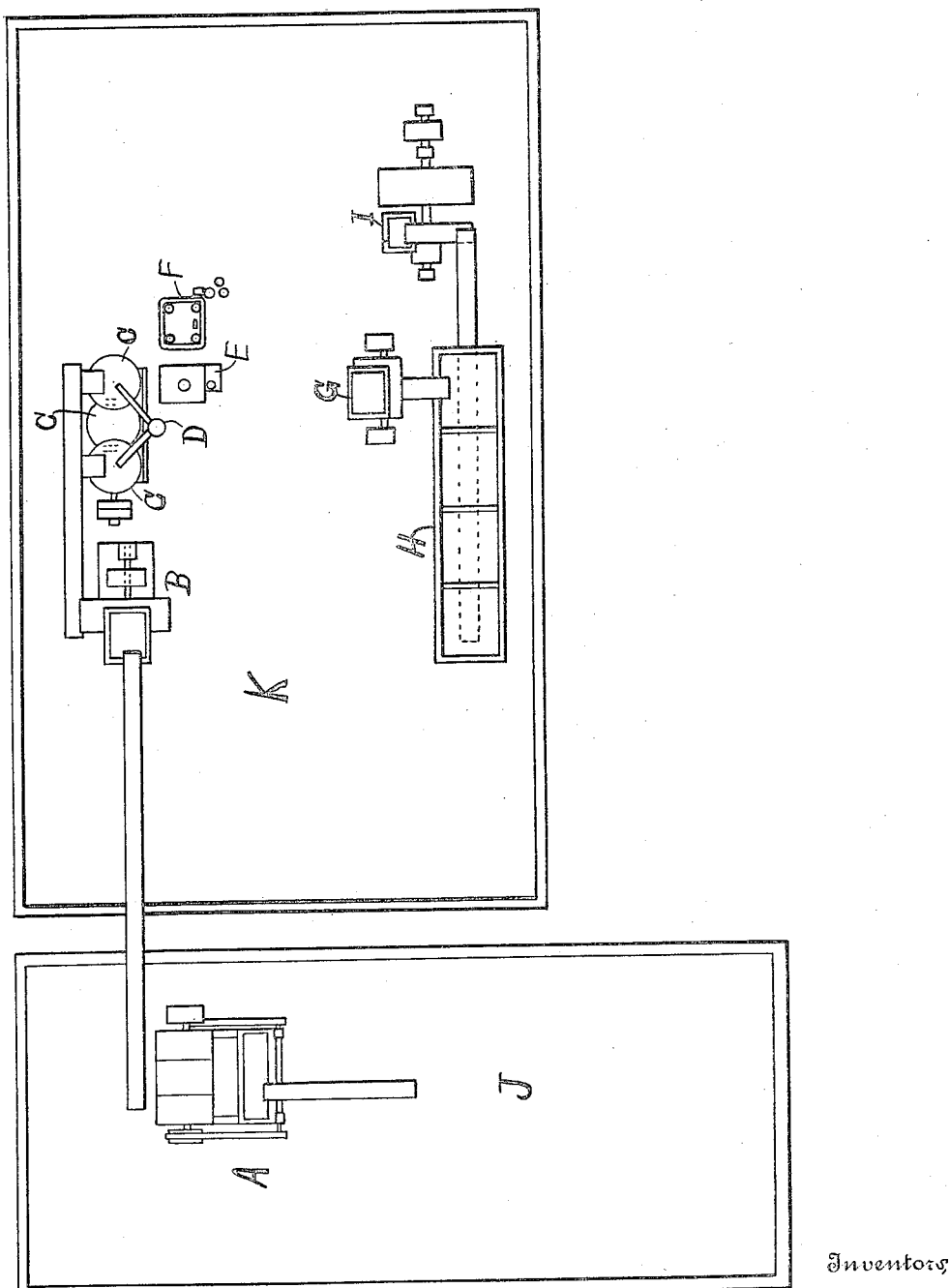
Witnesses:—
Inventors
Wm. A. Willis
and
Joe H. Beland.
By A. L. Jackson
Attorney

UNITED STATES PATENT OFFICE.

WILLIAM A. WILLIS AND JOE H. BELAND, OF FORT WORTH, TEXAS.

PREPARING STOCK FOOD AND OIL FROM COTTON-SEED.

994,088.  Specification of Letters Patent.  Patented May 30, 1911.

Application filed September 19, 1910.  Serial No. 582,759.

*To all whom it may concern:*

Be it known that we, WILLIAM A. WILLIS and JOE H. BELAND, both citizens of the United States, residing at Fort Worth, in the county of Tarrant and State of Texas, have invented a new and Improved Process of Preparing Stock Food and Oil from Cotton-Seed, of which the following is a specification.
Our invention relates to a process of cooking cotton seed kernels and hulls and of obtaining oil and preparing a stock food from the cotton seed, and the object is to provide a method by which more oil can be obtained from cotton seed and a valuable stock food prepared from the cotton seed and by which much material which is lost by processes now in use can be saved, by which the stock food is already prepared as soon as the process is completed, and by which much expense is avoided. Expense is avoided because much machinery and labor are dispensed with and it is not necessary to work the material a second time.
Other objects and advantages will be fully explained in the following description and the invention will be more particularly pointed out in the claims.

Reference is had to the accompanying drawing which is merely diagrammatic.

J represents the plan of a seed-house, and K represents a plan of the mill-house.

The seed are first cleaned in a machine indicated A. The seed are then delivered to a crushing machine B, in which the seed are merely crushed. The mixed hulls and kernels are then delivered to cookers C, C, and C. During the cooking a solution of salt is delivered to the cookers from a vessel D.
After the kernels and hulls have been sufficiently cooked and seasoned with the salt, the mixture is formed into cakes by a machine E. From the cake former E the cakes are put in a press F in which the oil is pressed out and the kernels and hulls pressed into harder cakes. The hot-pressed cakes are then placed in a breaking machine G and from the machine G the broken cakes are delivered to bins H. From the bins H the broken mixture of kernels and hulls are delivered by suitable conveyers to a mill I in which the mixture is ground and prepared into a stock food.

The cotton seeds are cleaned by suitable machinery in the seed house and are moved by suitable conveyers to crushing machines. The seed may be cooked without crushing, but it is preferable to crush the seed before cooking. After the seed have been crushed, the mixture of kernels and hulls is then elevated and conveyed to suitable locations to be fed to the cookers. The kernels or meat and hulls are cooked together in the cookers. The mixture of kernels and hulls is cooked under a steam pressure of approximately forty pounds for about forty minutes and at a temperature above the boiling point of water. The cooked mixture is then removed from the cookers and prepared for the presses. This step in the process consists of forming the cakes in flat pans to be placed in the presses with the press cloth. The mixture of hulls and meat is thus formed into cakes and then the oil is pressed out. One advantage of pressing the mixture of the cooked hulls and the meat together is the great saving in press cloth. Where the meat alone is pressed, there is tremendous strain on the press cloth because there is a tendency of the meal to escape under the pressure. The hulls with the fiber thereon and the motes which accompany the same form a binder for the meat, and make it possible to apply much more pressure to the meat. Without the hulls, more pressure cannot be applied to the meat than is customary in the process now in use because the meat would ooze out and escape and have to be worked over. The motes and fiber and hulls formed into the cakes with the meat would enable the cakes to maintain their position in the press and much more power could be applied to the cakes and thus press more oil and at the same time effect a saving of the press cloth because it would not be subject to the tearing process where the cakes are formed of meat alone. After the oil has been pressed out, the cakes are removed from the presses and delivered to the hot cake breakers. The broken or cracked cakes of meat and hulls are then stored in suitable receptacles to be fed to the grinding mills. The cakes are broken in the hot cake breakers to prepare the same for the mills. The mixture of cracked meat or kernels and hulls is then ground into meal or food for stock and is ready for the stock without further preparation. The food thus prepared is a mixture of hulls, kernels, motes and fiber already cooked whereas in the process in use the motes are lost and the uncooked hulls are mixed with meal to be fed to the stock.

The fact that more pressure can be applied in the process herein described makes it possible to obtain more oil from the seed. More meal is saved because in the old process of separating the kernels from the hulls, much of the kernels was lost. The meat or kernels and the hulls being cooked together, pressed together, and ground together make a richer and a more palatable food for stock than mixing uncooked hulls with meal. The cooked mixture is much better food because each animal will get its proper proportion of meal to the hulls consumed. Much expense is saved in dispensing with the separating machines because the machines are dispensed with and elevators, shafts, pulleys, and conveyers are also dispensed with and the workmen who have to look after such machinery are not needed.

The mixture may be salted prior to the cooking. The salt is prepared in a solution and is held in solution and may be delivered to or mixed in the crushed kernels and hulls simultaneously with the feeding of the kernels and hulls to the cookers, so that the salt and the mixture of kernels and hulls are all cooked together. If the salt is added, the stock food is much better seasoned than the stock food could otherwise have been prepared. The oil will contain only a fraction of one per cent. of salt. This small amount will be an advantage in preserving the oil and this salt will be removed by the refinery.

Pressing the hulls with the kernels does not deteriorate the oil. The oil may be a little darker. The refinery will take the darkness out. The main object is to obtain a prepared stock food which is composed of the cooked hulls and the meal already seasoned with salt. The advantage is that the stock get much better food and more oil is obtained from the seed. The old process involves much loss of hulls and some meal and oil, and all the motes are lost. The new process avoids all this loss.

Having fully described our invention, what we claim as new and desire to secure by Letters Patent, is,—

1. The herein described process of obtaining oil and stock-food from cotton seed consisting of cooking the mixed kernels and hulls together under a steam pressure of approximately forty pounds, preparing the cooked mixture for the press and pressing the oil out of the meat and hulls, and preparing the pressed mixture for stock.

2. The herein described process of obtaining oil and stock-food from cotton seed consisting of cooking the mixed kernels and hulls together approximately forty minutes and at a steam pressure of forty pounds and above boiling point of water, preparing the cooked mixture for the press and pressing the oil out of the meat and hulls, and preparing the pressed mixture for stock food.

3. The herein described process of obtaining oil and stock-food from cotton seed consisting of cooking the mixed kernels and hulls together under a steam pressure of approximately forty pounds and at a temperature above the boiling point of water, preparing the cooked mixture for the press and pressing the oil out of the meat and hulls, and preparing the pressed mixture for stock food.

4. The herein described process of obtaining stock-food and oil from cotton seed consisting of cleaning the seed, crushing the seed, cooking the crushed kernels and hulls under a steam pressure of approximately forty pounds and at a temperature above the boiling point of water, pressing the oil out of the cooked kernels and hulls, and preparing a stock-food from the cooked meat and hulls.

5. The herein described process of obtaining oil and stock-food from cotton seed consisting of crushing the seed, feeding a solution of salt substantially in the proportion described to the mixture of kernels and hulls, cooking the mixture of crushed kernels and hulls, pressing the oil out of said mixture, and preparing a stock-food from the cooked mixture.

6. The herein described process of obtaining oil and stock food from cotton seed consisting of cleaning the seed, crushing the seed, mixing salt into the mass of kernels and hulls, cooking the kernels and hulls and salt together, forming cakes of the said mixture, pressing the oil out of the mixture, breaking the cakes, and grinding the crushed cakes into a stock food.

In testimony whereof, we set our hands in the presence of two witnesses, this 12th day of September, 1910.

WILLIAM A. WILLIS.
JOE H. BELAND.

Witnesses:
A. L. JACKSON,
B. A. TOLBERT.